United States Patent Office 2,918,821
Patented Dec. 29, 1959

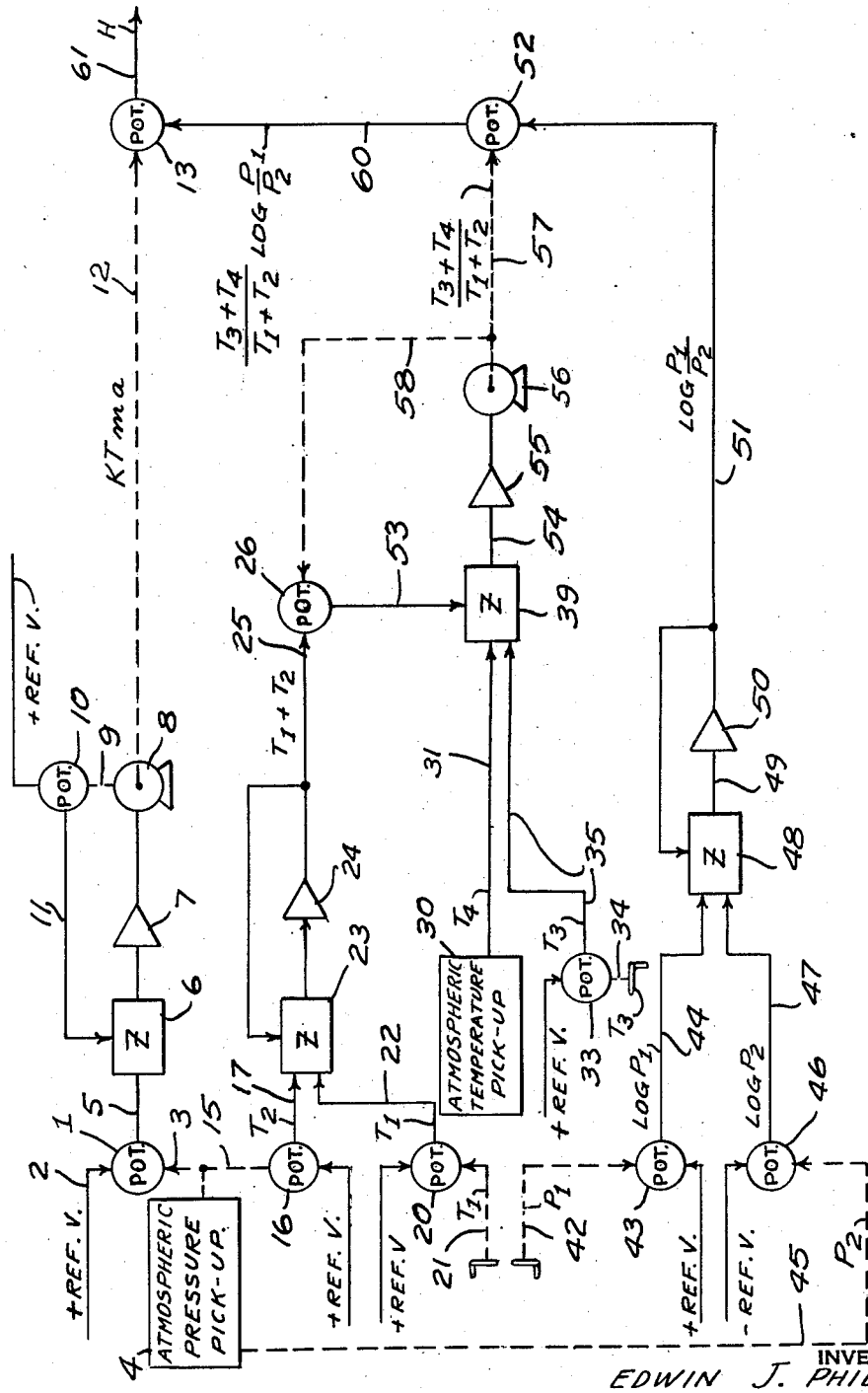

2,918,821
ATMOSPHERE SAMPLING ALTIMETER

Edwin J. Philipps, Seaford, N.Y., assignor to Sperry Rand Corporation, Ford Instrument Company Division, Long Island City, N.Y., a corporation of Delaware Application January 22, 1957, Serial No. 635,260

2 Claims. (Cl. 73—384)

This invention relates to a system for determining altitude and more particularly to a system for computing the height of an airplane from selected atmospheric data.

An object is to compute accurately the height of the airplane above a target area from data obtained at the airplane and atmospheric data available at a known location such as an airport.

Another object is to provide an accurate computer for computing altitude from data representing the atmospheric temperature and pressure at the location of the airplane and the mean temperature and average temperature between known pressure levels above the airport as determined by atmospheric sampling methods.

Another object is to provide a system of the above type in which errors due to temperature inversion in the atmosphere above the target are largely eliminated.

Other objects and advantages will be apparent as the nature of the invention is more fully disclosed.

The equation commonly used in determining altitude is:

$$H = KT_m \log \frac{P_1}{P_2} \quad (1)$$

where $T_m$ represents the mean temperature of the atmospheric column between pressure levels $P_1$ and $P_2$, $P_1$ is the barometric pressure at a known elevation such as sea level, and $P_2$ is the barometric pressure at the airplane at the height H.

This equation gives an accurate altitude determination, if $T_m$ is known. However this is usually not the case when an airplane is flying over an unknown area or over a target area. Likewise average temperatures between level $P_1$ and level $P_2$ may vary between a known location, as above an airport, and an unknown location, as over a target and if temperature inversion occurs the variation is sufficient to introduce a substantial error into the calculations.

The present invention is based upon the discovery that in most cases the ratio of mean temperature to average temperature in the atmospheric columns between the same pressure levels above two areas in the same general location, such as an airport and a target area, is substantially constant. This is expressed mathematically as follows:

$$\frac{T_{mt}}{\frac{T_3+T_4}{2}} = \frac{T_{ma}}{\frac{T_1+T_2}{2}} \quad (2)$$

where $T_{mt}$ is the mean temperature over the target between pressure levels $P_1$ and $P_2$, $T_{ma}$ is the mean temperature above the airport between the same pressure levels, $T_1$ and $T_2$ are temperatures above the airport at pressure levels $P_1$ and $P_2$, respectively, and $T_3$ and $T_4$ are temperatures above the target at pressure levels $P_1$ and $P_2$, respectively.

Equation 2 reduces to $$T_{mt} = \left(\frac{T_3+T_4}{T_1+T_2}\right) T_{ma} \quad (3)$$

substitutes Equation 3 for $T_m$ in Equation 1

$$H = KT_{ma}\left(\frac{T_3+T_4}{T_1+T_2}\right) \log \frac{P_1}{P_2} \quad (4)$$

A computer adapted to solve this equation is illustrated in the drawing wherein the figure is a diagrammatic representation of a system embodying the invention.

In the drawing the dotted lines indicate mechanical connections and the full lines represent electrical connections.

A potentiometer 1 is supplied with a fixed reference voltage by line 2 and is provided with a variable tap which is set mechanically by linkage 3 from the output of an atmospheric pressure pick-up 4 which is carried in the airplane and has an output representing $P_2$. The potentiometer 1 is non-linear and is so wound that its output voltage in line 5 represents $KT_{ma}$, that is the mean temperature in the air column above the airport up to pressure level $P_2$. This data is obtained by the usual atmosphere sampling method and is set into the equipment prior to flight.

The $KT_{ma}$ voltage is fed to a combining circuit 6 and amplifier 7 to position to motor 8 having a follow-up connection 9 driving a potentiometer 10 to produce an electrical feedback voltage which is fed by line 11 to the combining circuit 6. The mechanical output of the motor 8 drives a linkage 12 which drives the variable tap of a potentiometer 13.

The atmospheric pressure pick-up 4 also actuates a linkage 15 which drives the variable tap of a potentiometer 16 having an output line 17. The potentiometer 16 is wound to provide an output voltage in line 17 which is proportional to the value $T_2$.

A linear potentiometer 20 is settable by a handle 21 to give an output voltage in line 22 representing $T_1$.

The voltages in lines 17 and 22 are combined in a combining circuit 23 and fed through amplifier 24 and output line 25 to a potentiometer 26. The value of $T_1$ is set into the potentiometer 20 prior to flight.

$T_4$ the temperature at the airplane is determined by a suitable temperature responsive device 30 and is fed as a voltage by line 31 to a combining circuit 39.

$T_3$ is set into a potentiometer 33 manually by a handle 34 to produce an output voltage in line 35 representing $T_3$. This value is obtained from known data and is set into apparatus prior to flight. Line 35 is connected to the combining circuit 39.

$P_1$ is set manually by a crank 42 into a logarithmic potentiometer 43 which is wound to give an output representing log $P_1$ in output line 44. This value is inserted prior to flight.

The value $P_2$ is introduced from the atmospheric pressure pick-up 4 through linkage 45 into logarithmic potentiometer 46 which is adapted to produce an output voltage in line 47 representing log $P_2$.

The lines 44 and 47 are connected to a subtracting network 48 to produce in output line 49 a voltage representing $$\log \frac{P_1}{P_2}$$

This voltage is passed through amplifier 50 to line 51, a voltage to a potentiometer 52.

The voltage representing $T_1+T_2$ is fed from potentiometer 26 by line 53 to combining circuit 39 which combines the voltages in lines 53, 31 and 35 to produce an output voltage in line 54 representing $$\frac{T_3+T_4}{T_1+T_2}$$

This voltage is fed through amplifier 55 to actuate a motor 56 which converts the input voltage to a mechanical output in linkage 57 representing the value $$\frac{T_3+T_4}{T_1+T_2}$$

A mechanical feed back is provided by linkage 58 to potentiometer 26.

The output linkage 57 actuates potentiometer 52 to produce in output lead 60 a voltage representing $$\frac{T_3+T_4}{T_1+T_2} \times \log \frac{P_1}{P_2}$$

This voltage is supplied to potentiometer 13 to produce in output line 61 a voltage representing $$KT_{ma}\frac{T_3+T_4}{T_1+T_2} \times \log \frac{P_1}{P_2}$$

which in accordance with Equation 4 represents the altitude H of the airplane.

It will be noted that all of the values except $T_4$ and $P_2$ which are measured in the airplanes are introduced prior to flight or may be adjusted during flight if necessary in response to radio reports. The values $T_4$ and $P_2$ are introduced automatically so that the output voltage H is automatically obtained and may be read on a suitably calibrated voltmeter scale.

If the altitude is known as in a bombing mission where a predetermined altitude is to be effected, the quantity $T_{ma}$ can be computed and set into the apparatus as a constant. Other variations may also be embodied in the computer according to the requirements in each case. The computer elements may also be mechanical instead of electrical, if desired.

What is claimed is:

1. A system mounted on a airplane for determining the elevation of the airplane over a target area comprising a mean temperature calculator including a first potentiometer having a source of reference voltage and a variable tap and wound to produce an output voltage proportional to the mean temperature in a reference air column from a selected minimum pressure to the pressure represented by the setting of the variable tap, an atmospheric pressure pick-up carried by the airplane and having an output proportional to the ambient air pressure and operatively connected to the variable tap of the first potentiometer, a second potentiometer having a variable tap, and means operatively connecting the output of the first potentiometer with the variable tap of the second potentiometer; together with means to determine the ratio between the average temperatures in two air columns between the same pressure levels above two areas including a third potentiometer having a source of reference voltage and a variable tap and wound to produce an output voltage proportional to the temperature of the air in the reference air column at an atmospheric pressure represented by the setting of the variable tap; means operatively connecting the output of the atmospheric pressure pick-up with the variable tap of the third potentiometer, means to introduce and combine with the output of the third potentiometer a voltage proportional to the temperature of the said reference air column at the selected minimum pressure and thereby constitute a first combined voltage, an atmosphere temperature pick-up carried by the airplane and having a voltage output proportional to the temperature of the ambient air, means to introduce and combine with the output of the atmospheric temperature pick-up a voltage proportional to the temperature of the air in the column including the target area at a selected minimum pressure and thereby constitute a second combined voltage, combining means receiving the said first and second combined voltage and having a voltage output proportional to the ratio of the combined voltages, a fourth potentiometer having a variable tap and an output connected to the second potentiometer, and means operatively connecting the output of the combining means with the variable tap of the fourth potentiometer; and means for determining the ratio between the logarithms of the said selected minimum atmospheric pressure and the pressure measured by the atmospheric pressure pick-up including a fifth potentiometer having a variable tap and a source of reference voltage and wound to produce an output voltage proportional to the logarithm of the atmospheric pressure represented by the setting of the variable tap, means operatively connecting the output of the atmospheric pressure pick-up with the variable tap, a sixth potentiometer having a voltage output proportional to the logarithm of the said selected minimum atmospheric pressure, a subtracting network connected to receive as inputs the outputs of the fifth and sixth potentiometers and having a voltage output proportional to the ratio of the said inputs and connected to the fourth potentiometer.

2. Apparatus carried by an airplane for computing the altitude of the airplane from data representing, $P_1$, $P_2$, $T_1$, $T_2$, $T_3$, $T_4$ and $T_{ma}$ where $P_1$ is the atmospheric pressure at a fixed level, $P_2$ is the atmospheric pressure at the height of the airplane, $T_1$ and $T_2$ are atmospheric temperatures at pressure levels $P_1$ and $P_2$ respectively, above a given area, $T_{ma}$ is the mean temperature over said given area between pressure levels $P_1$ and $P_2$ and $T_3$ and $T_4$ are atmospheric temperatures at pressure levels $P_1$ and $P_2$, respectively, in the area over which the airplane is flying, said apparatus comprising an atmospheric pressure pick-up having an output representing $P_2$, a first variable voltage device operatively connected to the output of the $P_2$ pick-up and having a voltage output proportional to $KT_{ma}$; a second variable voltage device operatively connected to the output of the $P_2$ pick-up and having a voltage output proportional to $T_2$, means for producing and combining with the $T_2$ voltage a voltage proportional to $T_1$, an atmospheric temperature pick-up having a voltage output proportional to $T_4$, means for producing and combining with the $T_4$ voltage a voltage proportional to $T_3$, a first ratio combining means connected to receive the combined voltage $T_1+T_2$ and $T_3+T_4$ and having a voltage output proportional to $$\frac{T_3+T_4}{T_1+T_2}$$

a third variable voltage device operatively connected to the output of the $P_2$ pick-up and having an output proportional to log $P_2$, a fourth variable voltage device settable in accordance with $P_1$ and having an output proportional to log $P_1$, a second ratio combining means connected to receive the log $P_1$ and log $P_2$ voltages and having a voltage output proportional to $$\log \frac{P_1}{P_2}$$

a fifth variable voltage device operatively connected to the output of the first ratio combining means and connected to receive the output of the second ratio combining means and having a voltage output proportional to $$\frac{T_3+T_4}{T_1+T_2} \log \frac{P_1}{P_2}$$

and a sixth variable voltage device operatively connected to the output of the first variable voltage device and connected to receive the output of the fifth variable voltage device and having a voltage output proportional to $$KT_{ma}\frac{T_3+T_4}{T_1+T_2} \log \frac{P_1}{P_2}$$

References Cited in the file of this patent

Electronic Analog Computers (Korn and Korn), published by McGraw-Hill Book Co., New York, 1952, pages 15, 30, 31 and 232.

Analog Methods in Computation and Simulation (Soroka), published by McGraw-Hill Book Co., New York, 1954, pages 72 and 73.